United States Patent
Hoshi (10) Patent No.: US 6,955,514 B2
(45) Date of Patent: Oct. 18, 2005

(54) CONNECTOR WITH MALE PART FOR FINAL FIXING

(75) Inventor: Shouichi Hoshi, Utsunomiya (JP)

(73) Assignee: NIFCO Inc., Yokohama (JP)

( * ) Notice: Subject to any disclaimer, the term of this patent is extended or adjusted under 35 U.S.C. 154(b) by 47 days.

(21) Appl. No.: 10/650,722

(22) Filed: Aug. 29, 2003

(65) Prior Publication Data
US 2004/0091334 A1 May 13, 2004

(30) Foreign Application Priority Data
Nov. 7, 2002 (JP) .............................. 2002-323824

(51) Int. Cl.$^7$ ............................................. F16B 19/00
(52) U.S. Cl. ........................ 411/508; 24/453; 24/297; 411/913
(58) Field of Search .............................. 411/45, 40–41, 411/508–510, 913, 356, 359; 24/453, 297

(56) References Cited

U.S. PATENT DOCUMENTS

| | | | | |
|---|---|---|---|---|
| 3,415,155 A | * | 12/1968 | Riddell et al. ............... | 411/548 |
| 3,871,430 A | * | 3/1975 | Meyer ......................... | 24/323 |
| 3,918,130 A | * | 11/1975 | Poe .............................. | 24/453 |
| 4,114,509 A | * | 9/1978 | Poe .......................... | 411/80.2 |
| 4,276,806 A | * | 7/1981 | Morel ......................... | 411/41 |
| 4,506,419 A | * | 3/1985 | Mitomi ....................... | 24/297 |
| 4,624,585 A | * | 11/1986 | Nix et al. .................... | 384/296 |
| 4,697,948 A | * | 10/1987 | Fukuda ....................... | 403/71 |
| 4,770,583 A | * | 9/1988 | Lindberg .................... | 411/340 |
| 4,865,505 A | * | 9/1989 | Okada ........................ | 411/512 |
| 4,874,276 A | * | 10/1989 | Iguchi ......................... | 411/48 |
| 4,927,287 A | * | 5/1990 | Ohkawa et al. .......... | 403/408.1 |
| 4,927,306 A | * | 5/1990 | Sato ............................ | 411/182 |
| 4,952,106 A | * | 8/1990 | Kubogochi et al. ........... | 411/48 |
| 5,143,500 A | * | 9/1992 | Schuring et al. ............ | 411/339 |
| 5,163,795 A | * | 11/1992 | Benoit et al. ................. | 411/45 |
| 5,322,402 A | * | 6/1994 | Inoue ......................... | 411/510 |
| 5,448,809 A | * | 9/1995 | Kraus ......................... | 24/453 |
| 5,651,632 A | * | 7/1997 | Gordon ...................... | 403/319 |
| 5,718,549 A | * | 2/1998 | Noda et al. ................. | 411/553 |
| 5,775,860 A | * | 7/1998 | Meyer ......................... | 411/46 |
| 5,935,170 A | * | 8/1999 | H.ang.kansson et al. ...... | 606/73 |
| 6,179,539 B1 | * | 1/2001 | Benoit et al. ............... | 411/433 |

(Continued)

FOREIGN PATENT DOCUMENTS

JP 62-166309 * 10/1987

(Continued)

OTHER PUBLICATIONS http://www.engineersedge.com/strength_of_materials.htm.*

*Primary Examiner*—Robert J. Sandy
*Assistant Examiner*—Jeffrey A. Sharp
(74) *Attorney, Agent, or Firm*—Manabu Kanesaka (57) ABSTRACT

A connector for fastening a member having an attaching hole includes a female part and a male part. The female part has a head portion, a leg portion, an inner space formed in the leg portion side and opened at the head portion, and an engaging projection formed on the leg portion for engaging the attaching hole. The engaging projection elastically bends inwardly and engages the attaching hole when the leg portion is inserted into the attaching hole. The male part has a pressing head portion, an inserting leg to be inserted into the inner space of the female part, a first engaging portion for engaging the female part so that the male part is temporarily fixed to the female part, and a second engaging portion for engaging the female part.

6 Claims, 12 Drawing Sheets

U.S. PATENT DOCUMENTS

| | | | |
|---|---|---|---|
| 6,364,586 B1 * | 4/2002 | Okada | 411/41 |
| 6,431,585 B1 * | 8/2002 | Rickabus et al. | 280/728.3 |
| 6,435,790 B1 * | 8/2002 | Ichikawa | 411/349 |
| 6,533,515 B2 * | 3/2003 | Meyer | 411/45 |
| 6,665,914 B2 * | 12/2003 | Ogawa | 24/297 |
| 2004/0091334 A1 * | 5/2004 | Hoshi | 411/508 |
| 2004/0136812 A1 * | 7/2004 | Kawai | 411/508 |
| 2004/0163218 A1 * | 8/2004 | Yuta | 24/297 |
| 2004/0175250 A1 * | 9/2004 | Yoneoka | 411/45 |
| 2004/0181917 A1 * | 9/2004 | Sawatani | 24/297 |

FOREIGN PATENT DOCUMENTS

| | | | |
|---|---|---|---|
| JP | 2002-106519 | * | 4/2002 |

* cited by examiner

CONNECTOR WITH MALE PART FOR FINAL FIXING

BACKGROUND OF THE INVENTION AND RELATED ART STATEMENT

The invention relates to a connector including a female part to be inserted into an attaching hole formed on a panel or the like and temporarily fixed thereto, and a male part to be temporarily assembled with the female part and fixing the female part to the attaching hole permanently. The connector can be used for connecting or interlocking more than two members in a permanently fixed state.

Japanese Patent Publication (KOKAI) No. 08-82312 has disclosed a connecting clip including a female member and a male member. The male member is inserted into the female member after the female member is inserted into an attaching hole, so that the female member is securely fixed to the attaching hole.

In such a connecting clip, the female member includes a cylindrical portion divided by slits. The male member includes a shaft portion to be inserted into the cylindrical portion of the female member. The female member and male member are temporarily assembled by allowing a projection formed inside the cylindrical portion of the female member to engage a small diameter portion formed at the forward end of the shaft portion of the male member. In the temporarily assembled state, after the cylindrical portion of the female member is inserted into the attaching hole, the shaft portion of the male member is completely inserted into the female member to open the cylindrical portion of the female member, so that the female member is completely attached to the attaching hole.

However, when the connecting clip disclosed in the reference is temporarily attached to the attaching hole, there is a chance that the head portion of the male member is inadvertently pressed. Therefore, even if the permanently fixed state is not completed yet, the male member is completely inserted into the female member, so that the permanently fixed state is inadvertently obtained.

In view of the above problems, the present invention has been made, and an object of the invention is to provide a connector, wherein when a female member or part is inserted into an attaching hole to be temporarily assembled thereto, even if a male member or part is inadvertently pressed, the male member is not completely inserted into the female member.

Further objects and advantages of the invention will be apparent from the following description of the invention.

SUMMARY OF THE INVENTION

In order to attain the above objects, according to the first aspect of the invention, a connector includes a female part having a head portion, a leg portion, and an inner space opened at a head portion side and extending to a leg portion side; and a male part having a pressing head portion and an inserting leg portion to be inserted into the inner space of the female part. The female part also includes an engaging projection on an outer surface of the leg portion. When the leg portion of the female part is inserted into an attaching hole, the engaging projection is pressed against the attaching hole, thereby elastically bending a portion where the engaging projection is formed inwardly. The leg portion of the female part is further inserted until the engaging projection is located at least at a position ahead of a hole edge portion at an insertion side of the attaching hole.

In the first aspect of the invention, the male part has the first engaging portion provided at a forward end side of the insertion leg portion for engaging an inner wall of the female part, so that the male part is temporarily assembled with the female part through the engagement of the first engaging portion. The male part also has the second engaging portion provided at a base side of the insertion leg portion for elastically engaging the inner wall of the female part when the male part is inserted into the female part from a temporarily assembled state. When the male part is inserted and the second engaging portion engages the inner wall, the insertion leg portion of the male part prevents the engaging projection of the female part from bending inwardly. Further, it is arranged that the second engaging portion of the male part engages the inner wall elastically with a force larger than that for elastically deforming the engaging projection of the female part.

With the structure as described above, when the leg portion of the female part is inserted into the attaching hole, the engaging projection abuts against the attaching hole side. At this state, the portion where the engaging projection is formed bends elastically toward the inner space side to thereby allow the leg portion to insert into the attaching hole. When the engaging portion of the leg portion is further inserted to a position ahead of a hole edge portion at an insertion forward side of the attaching hole, the portion with the engaging projection is bounced. Therefore, the head portion and the engaging projection hold a member with the attaching hole, so that the female part, i.e. the connector, is temporarily fixed to the member with the attaching hole.

In the first aspect of the invention, the first engaging portion is provided at the forward end side of the insertion leg portion of the male part for engaging the inner wall of the female part. Therefore, the male part and the female part are not separated before or after the temporary fixing. From the temporarily fixed state, the male part is further inserted into the female part to a position where the second engaging portion engages the inner wall. Accordingly, the insertion leg portion of the male part prevents the portion where the engaging projection of the female part is formed from bending, so that the final fixing of the connector is completed.

In the first aspect of the invention, it is arranged that the second engaging portion of the male part elastically engages the inner wall with a force larger than that for elastically deforming the engaging projection of the female part. Therefore, when the female part is inserted into the attaching hole to allow the engaging projection of the female part to engage for the temporarily fixing, it is possible to press the pressing head portion of the male part during the temporary fixing. After the temporary fixing, the pressing head portion of the male part is pressed one more time, so that the female part is permanently fixed to the attaching hole.

According to the second aspect of the invention, in the connector in the first aspect, either the pressing head portion of the male part or the head portion of the female part is provided with a maintaining engagement portion for elastically engaging the other of the pressing head portion of the male part or the head portion of the female part when the male part is inserted from the temporarily assembled state into a position where the second engaging portion engages the inner wall of the female part so that the permanently fixed state is maintained. With the structure as described above, unless the maintaining engagement portion is disengaged, the permanently fixed state is maintained.

According to the third aspect of the invention, in the connectors in the first and second aspects, the second engaging portion of the male part is a projection formed on an outer surface of the insertion leg portion. Further, a space is provided in the insertion leg portion for allowing the portion where the projection is formed, to bend elastically. With the structure as described above, the male part is completely inserted into the female part smoothly while the male part elastically deforms from the temporarily assembled state.

DETAILED DESCRIPTION OF PREFERRED EMBODIMENTS

Figure 1:
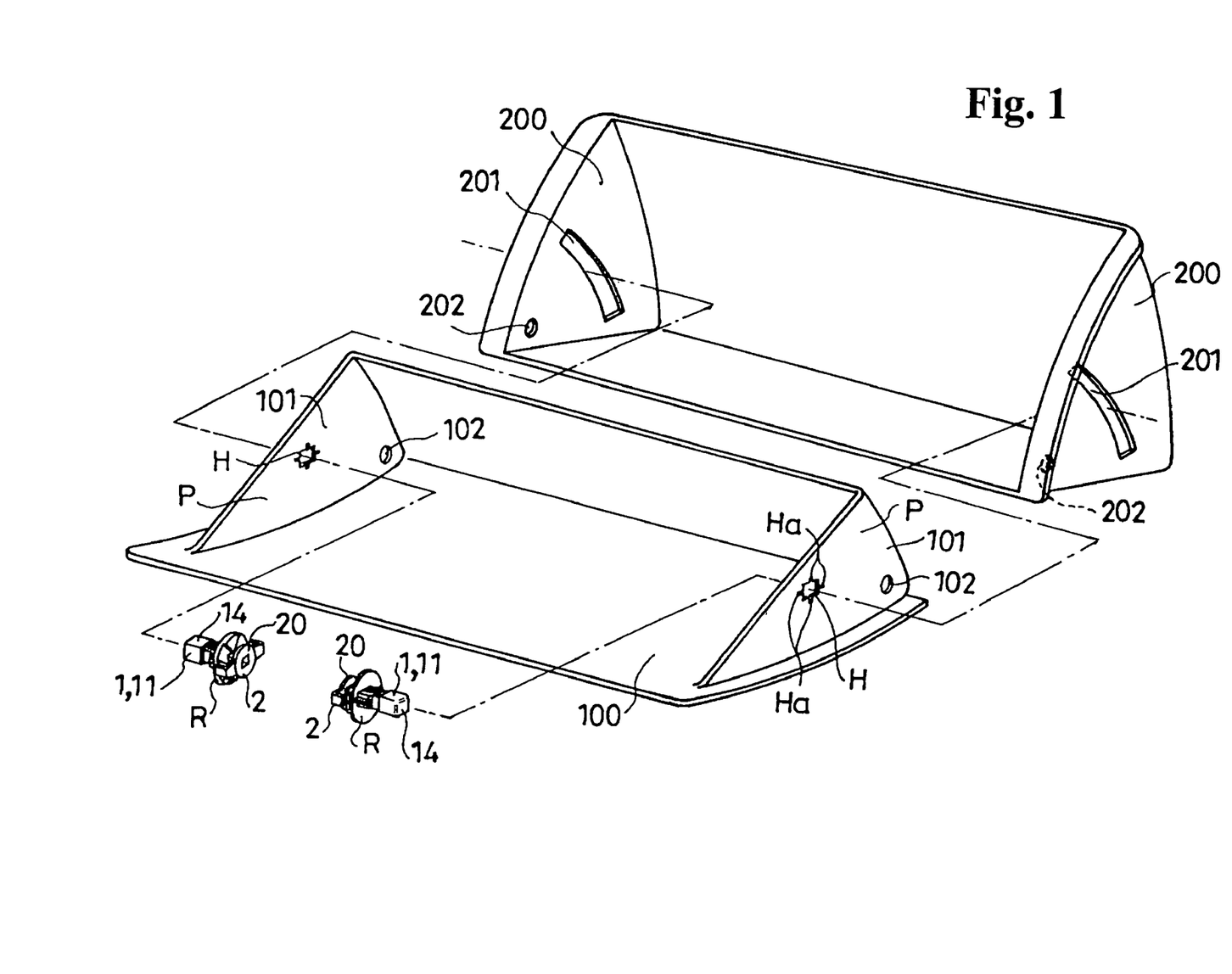
FIG. 1 is an exploded perspective view showing components of an attaching structure of a box member.

Hereunder, embodiments of the present invention will be explained with reference to the accompanying drawings. FIG. 1 is a drawing showing an attaching structure of a box member 100 with connectors R according to the present invention in a state that components constituting the attaching structure are disassembled for a display purpose.

Figure 2:
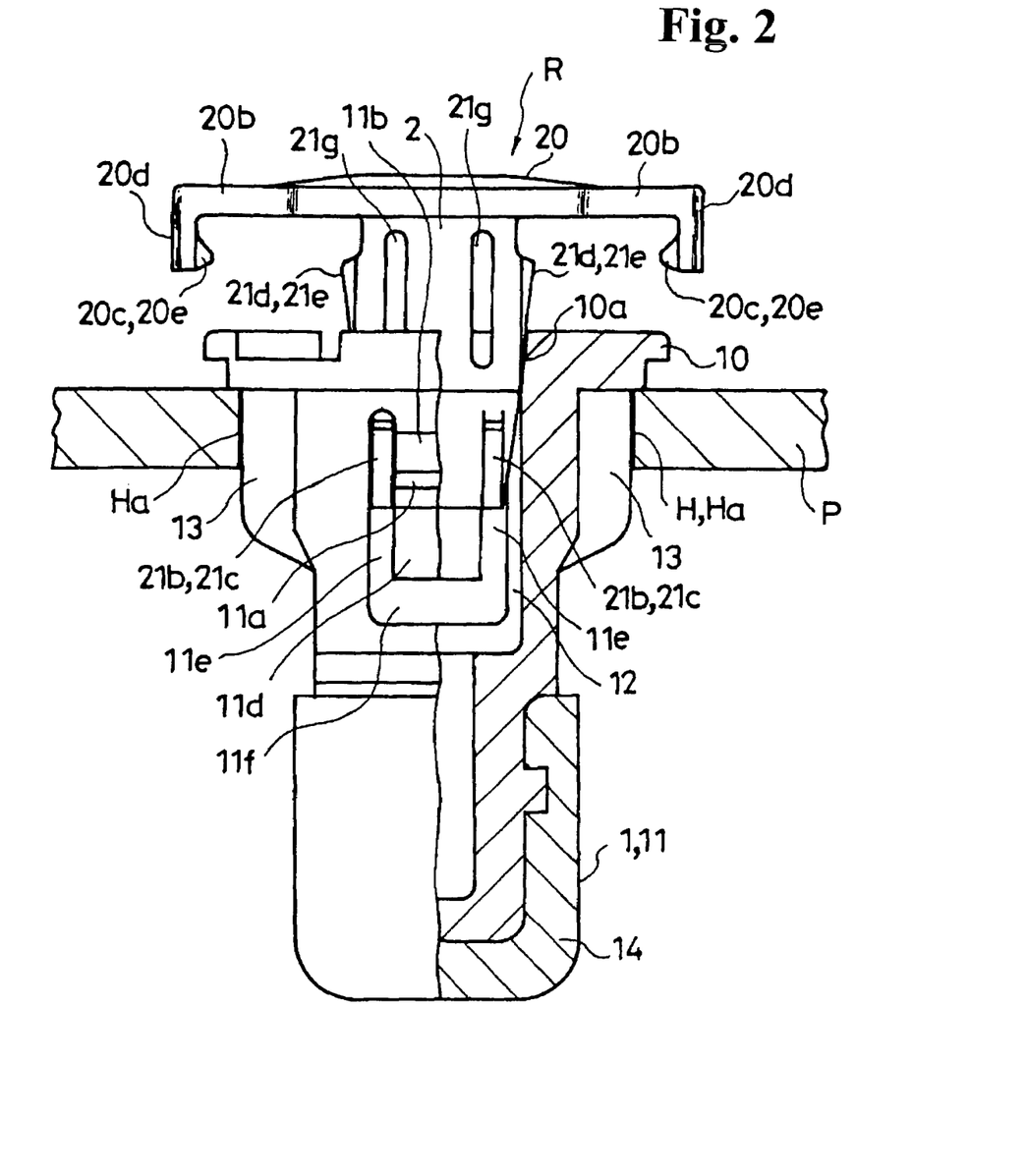
FIG. 2 is a partially sectional side view of a connector in a temporarily fixed state.
Figure 3:
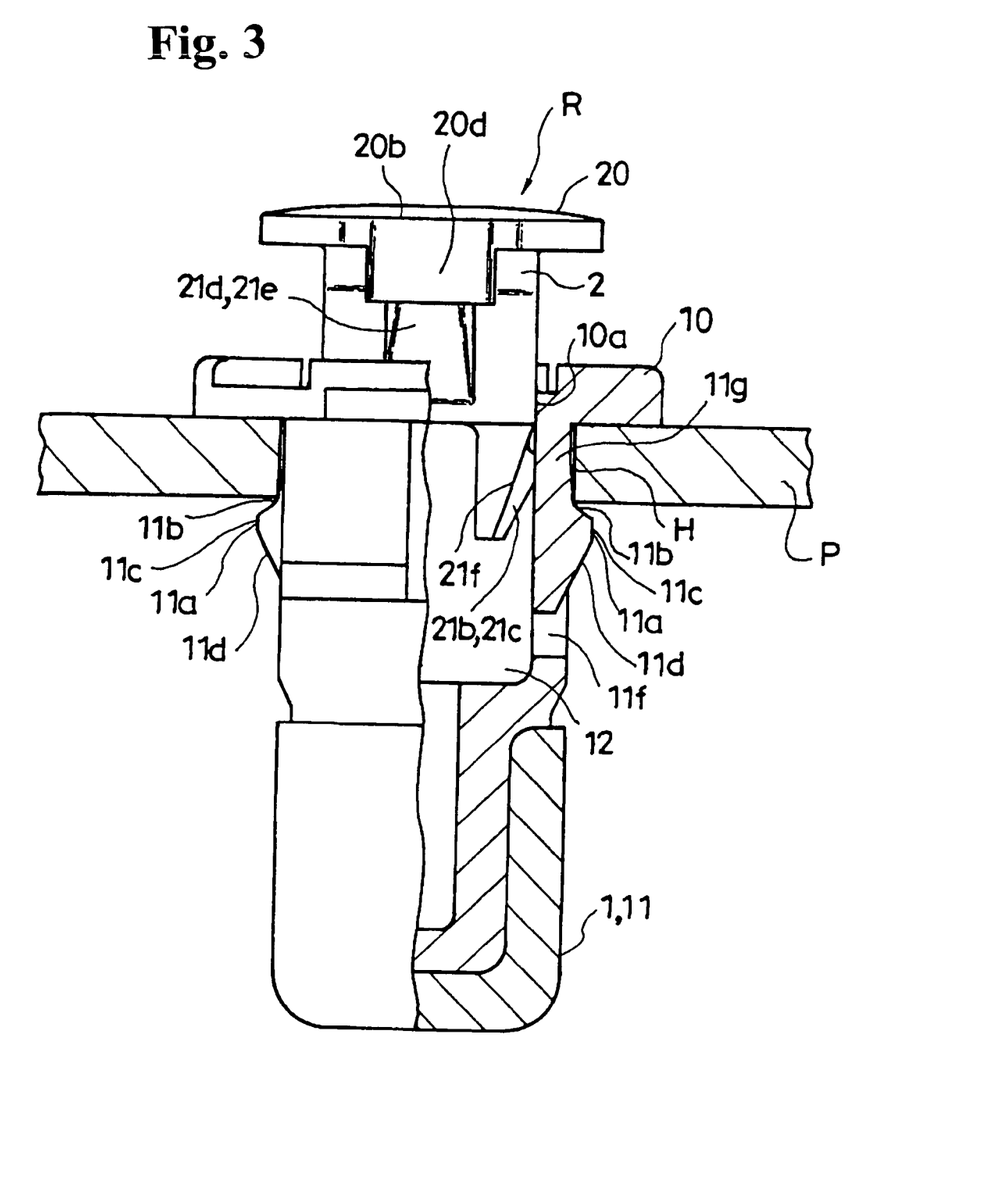
FIG. 3 is a partially sectional side view of the connector in the temporarily fixed state.
Figure 4:
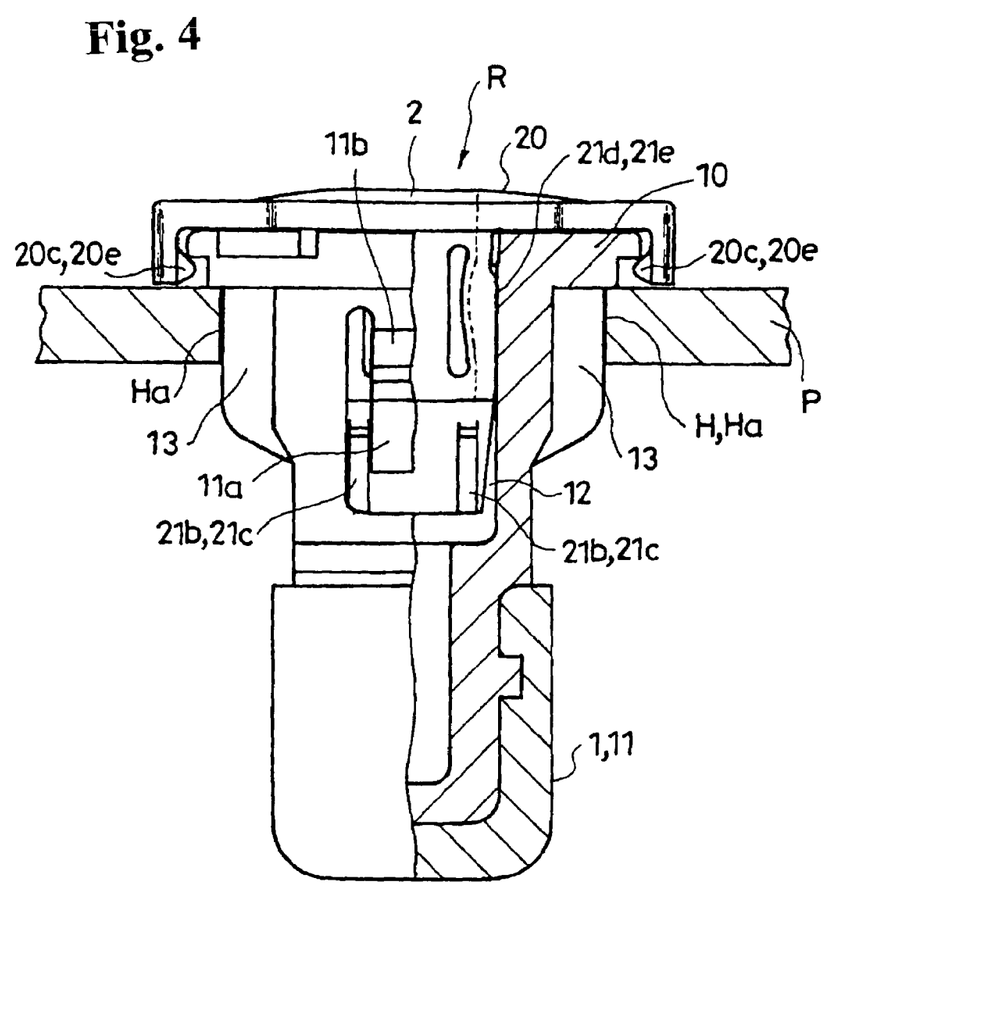
FIG. 4 is a partially sectional side view of the connector in a permanently fixed state.
Figure 5:
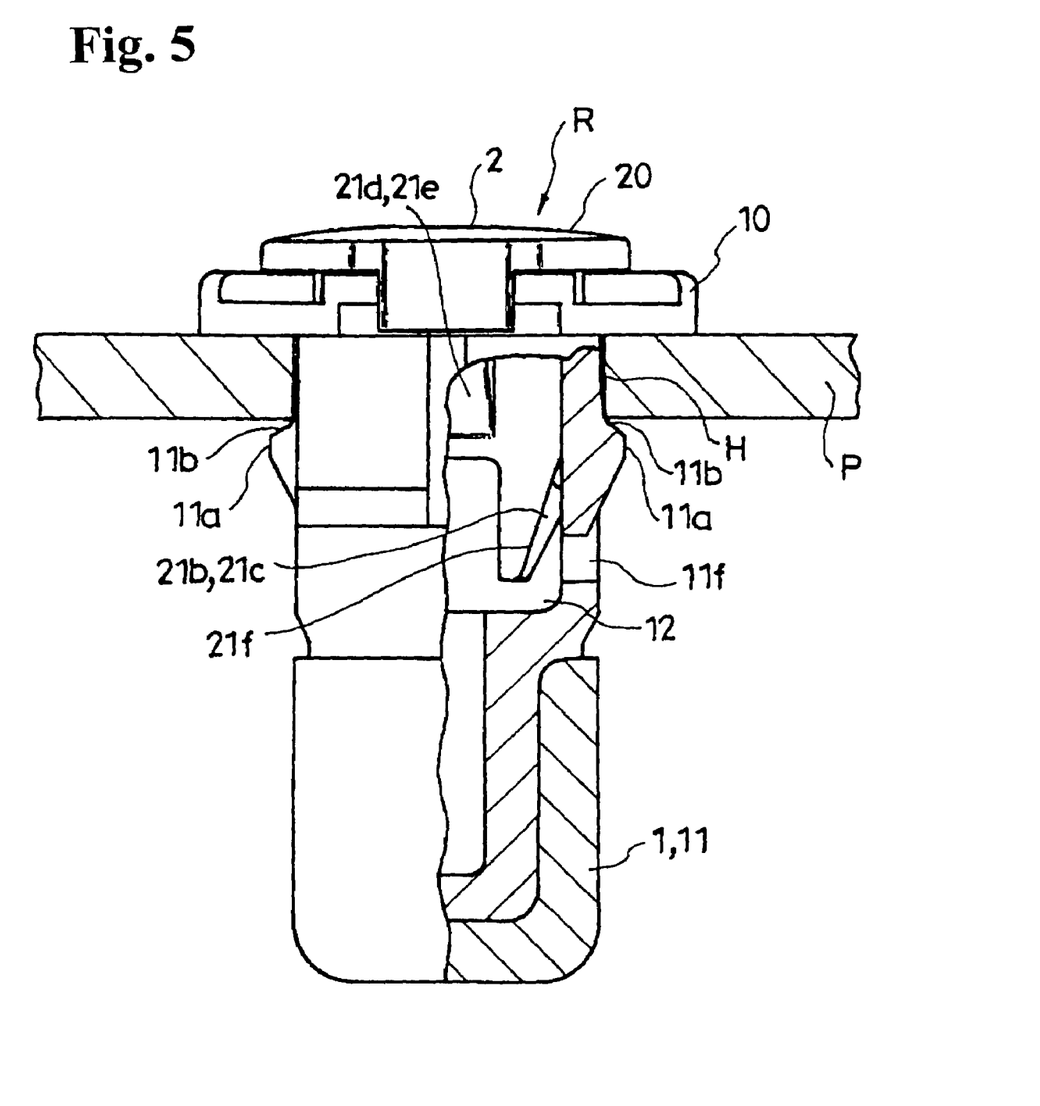
FIG. 5 is a partially sectional side view of the connector in the permanently fixed state.
Figure 6:
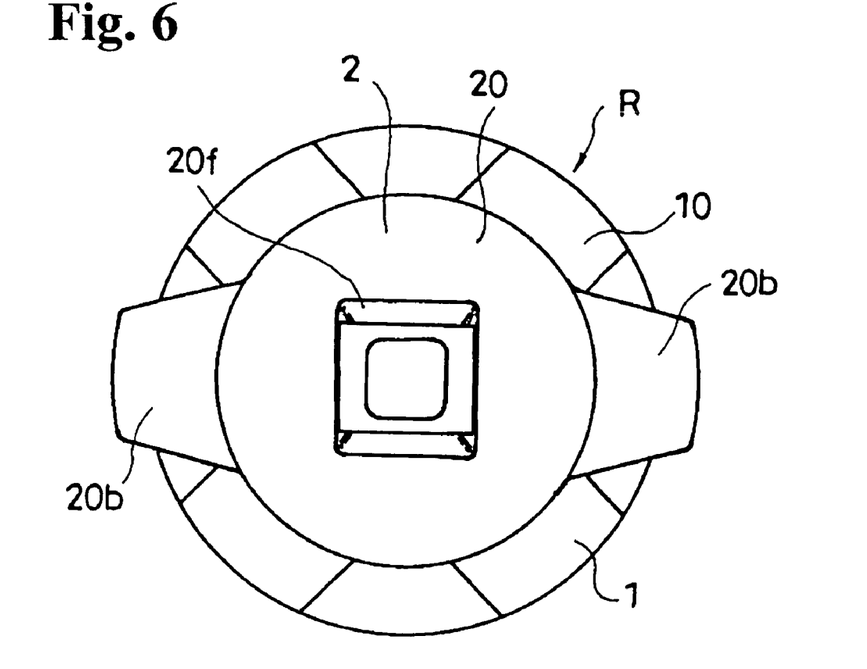
FIG. 6 is a plan view of the connector in the temporarily assembled state.
Figure 7:
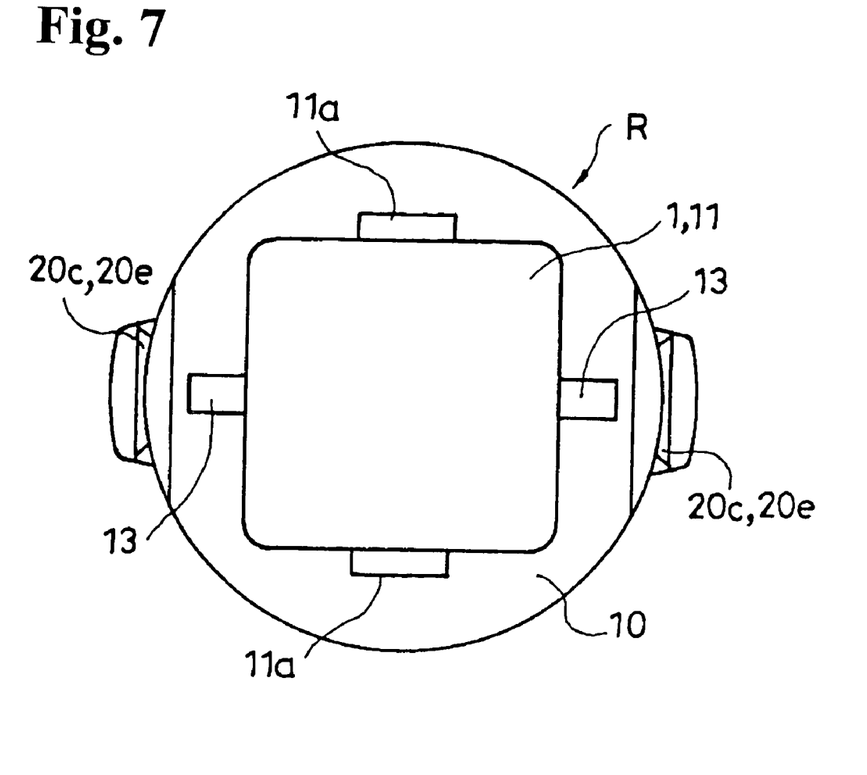
FIG. 7 is a bottom view of the connector in the temporarily assembled state.
Figure 8:
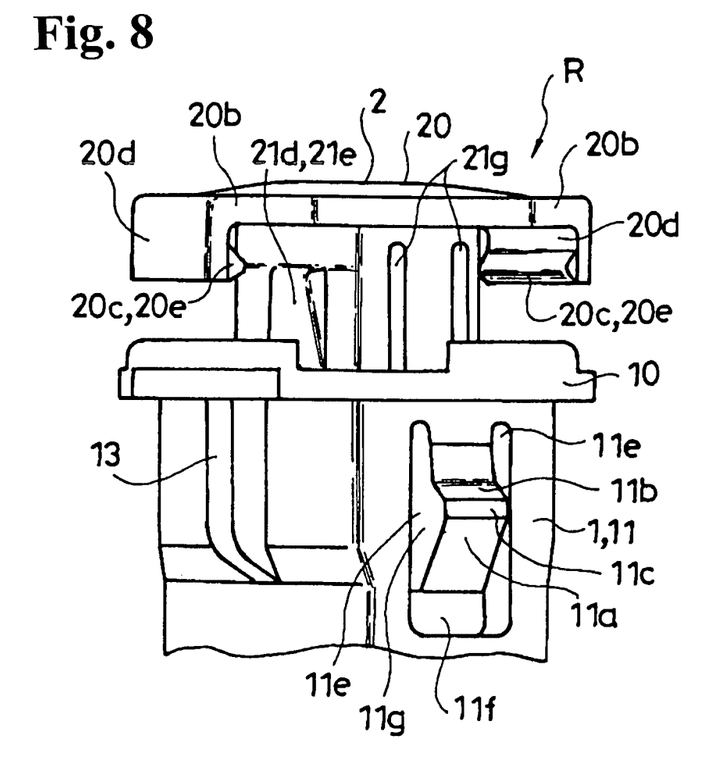
FIG. 8 is a perspective view of an essential part of the connector in the temporarily assembled state.
Figure 9:
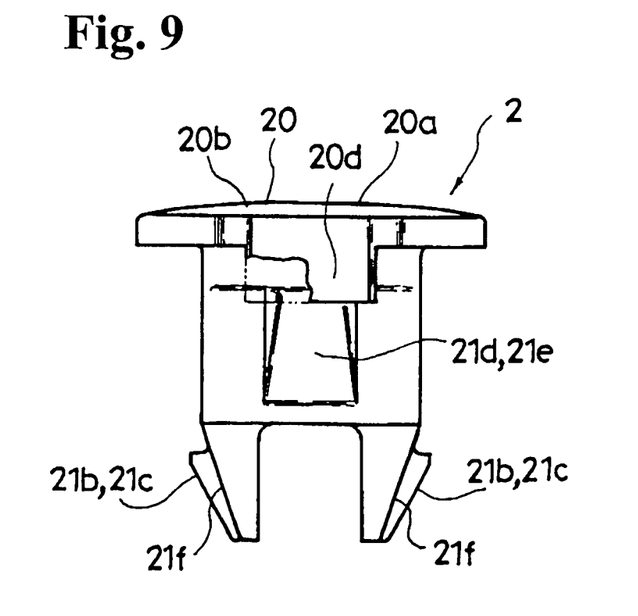
FIG. 9 is a partially sectional side view of a male part.
Figure 10:
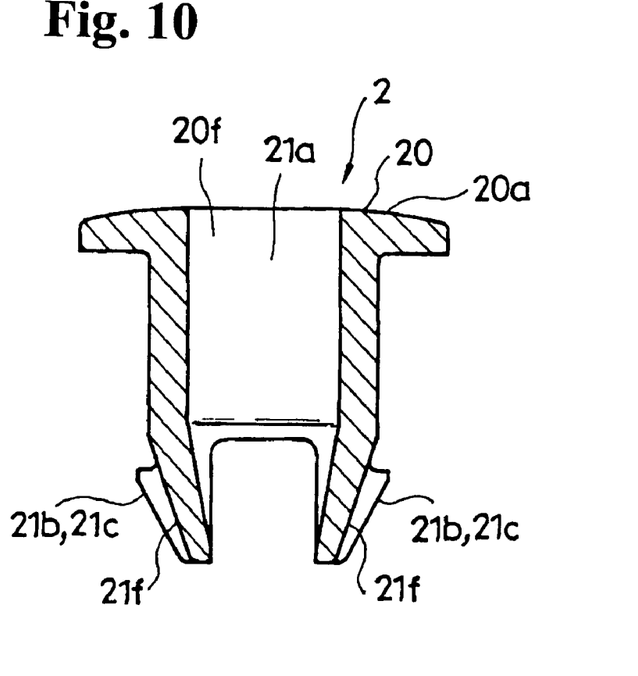
FIG. 10 is a sectional view of the male part.
Figure 11:
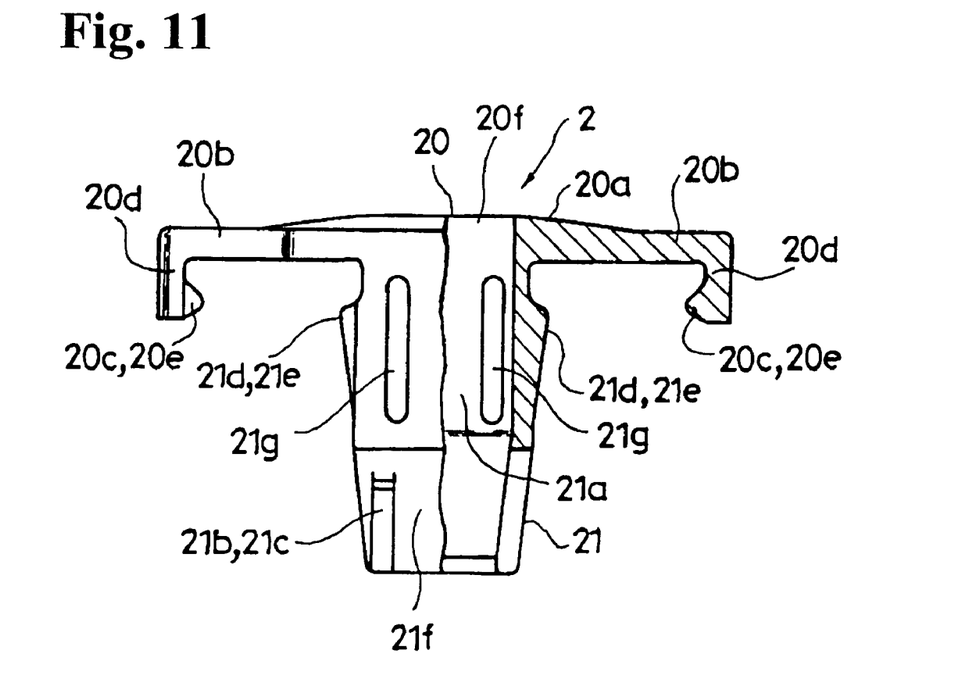
FIG. 11 is a partially sectional side view of the male part.
Figure 12:
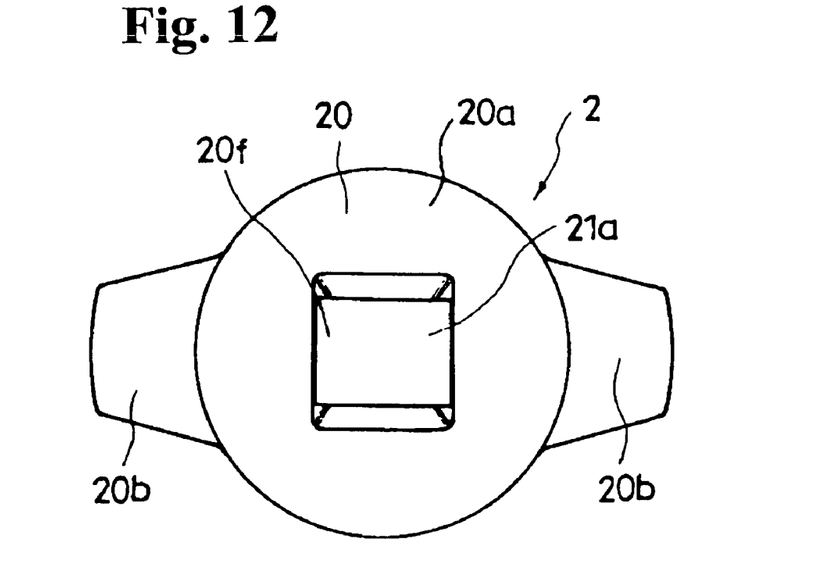
FIG. 12 is a plan view of the male part.
Figure 13:
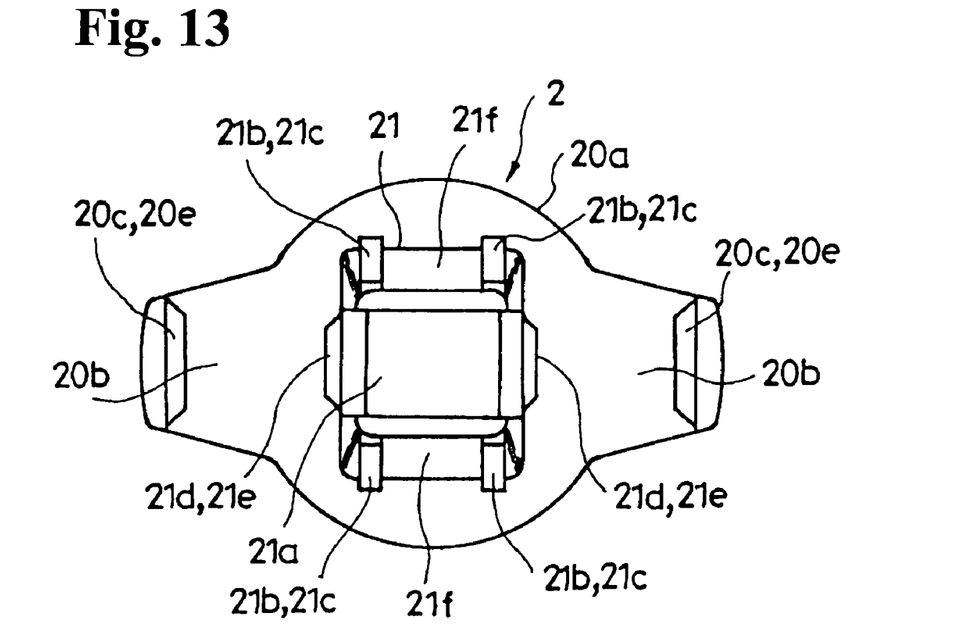
FIG. 13 is a bottom view of the male part.
Figure 14:
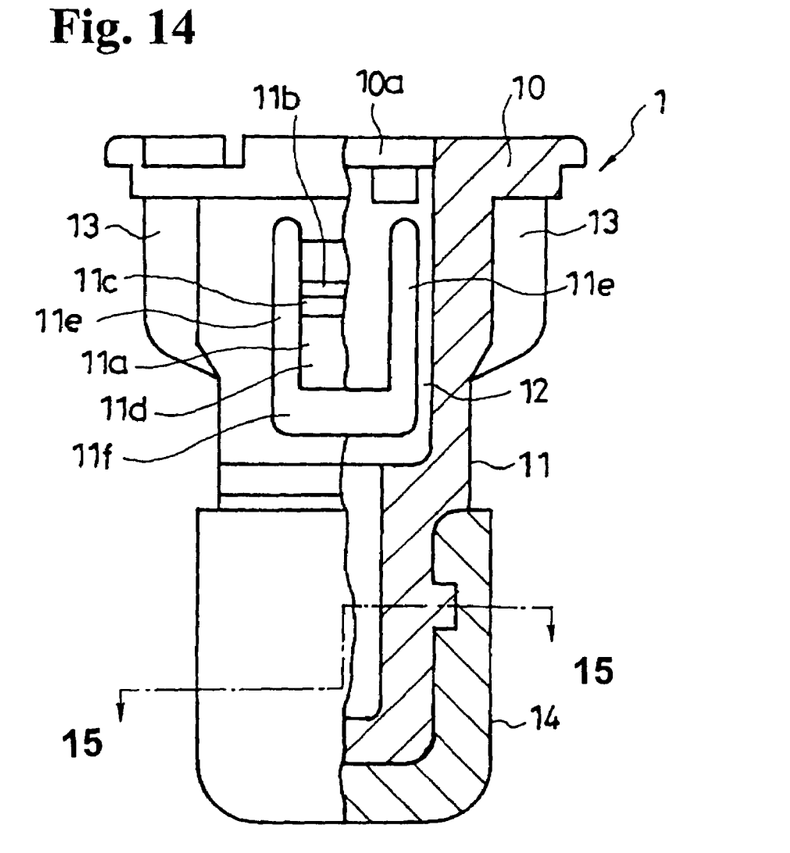
FIG. 14 is a partially sectional side view of the male part.
Figure 15:
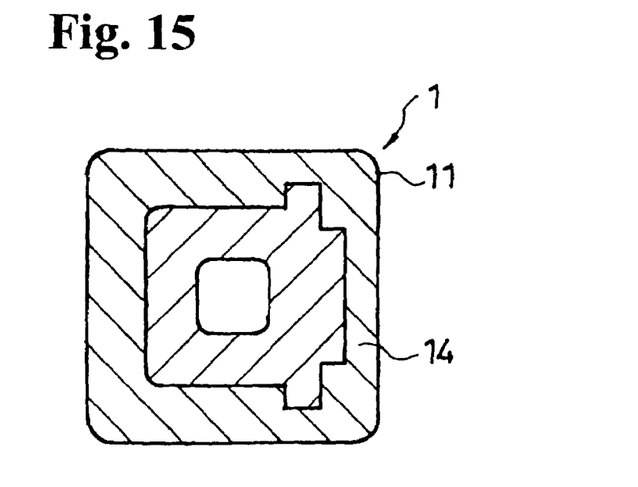
FIG. 15 is a sectional view of the male part taken along line 15—15 in FIG. 14.
Figure 16:
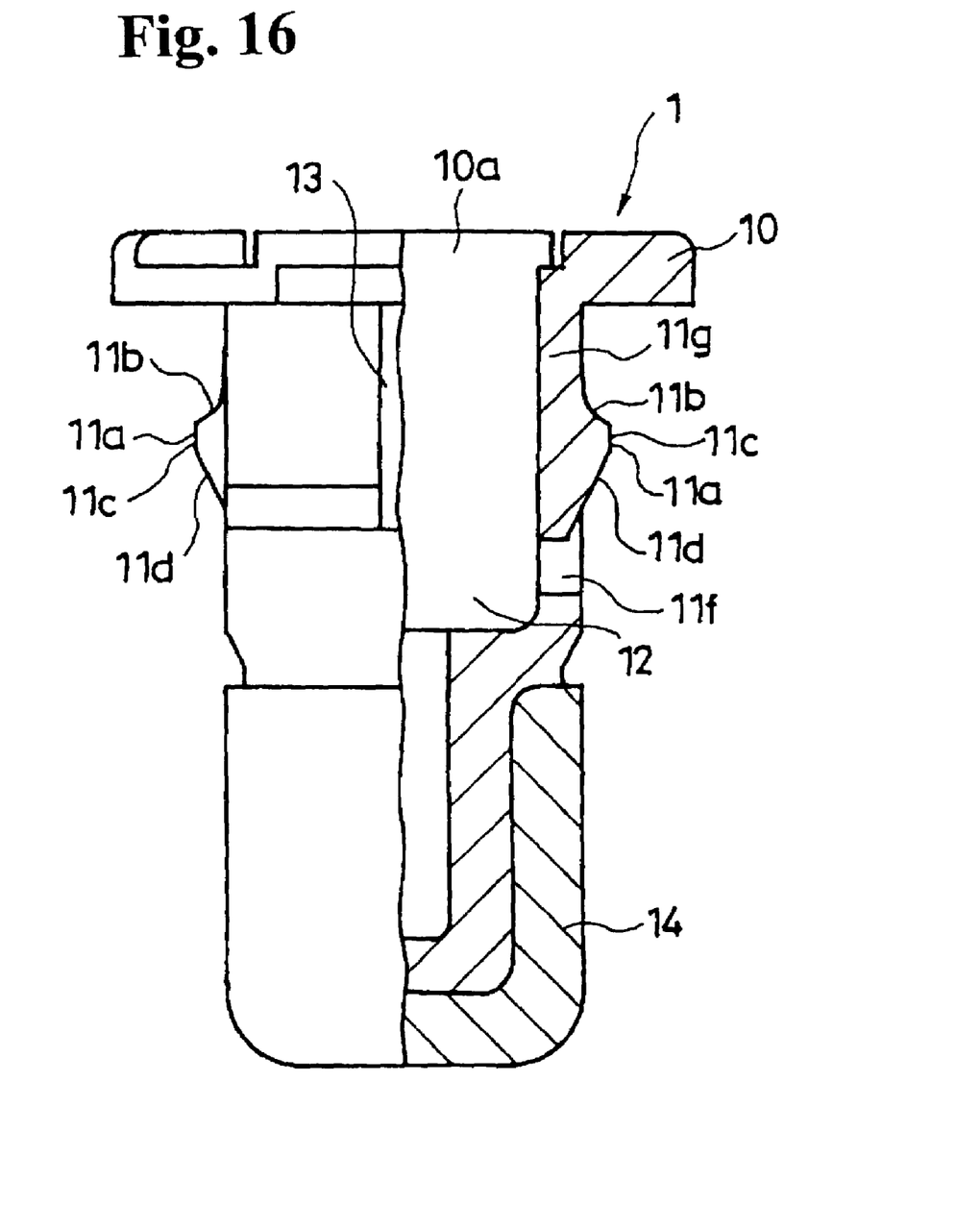
FIG. 16 is a partially sectional side view of a female part.
Figure 17:
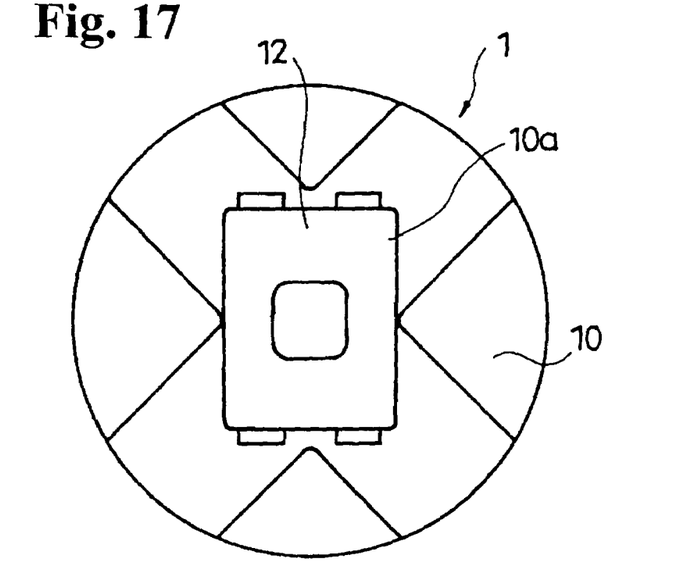
FIG. 17 is a plan view of the female part.
Figure 18:
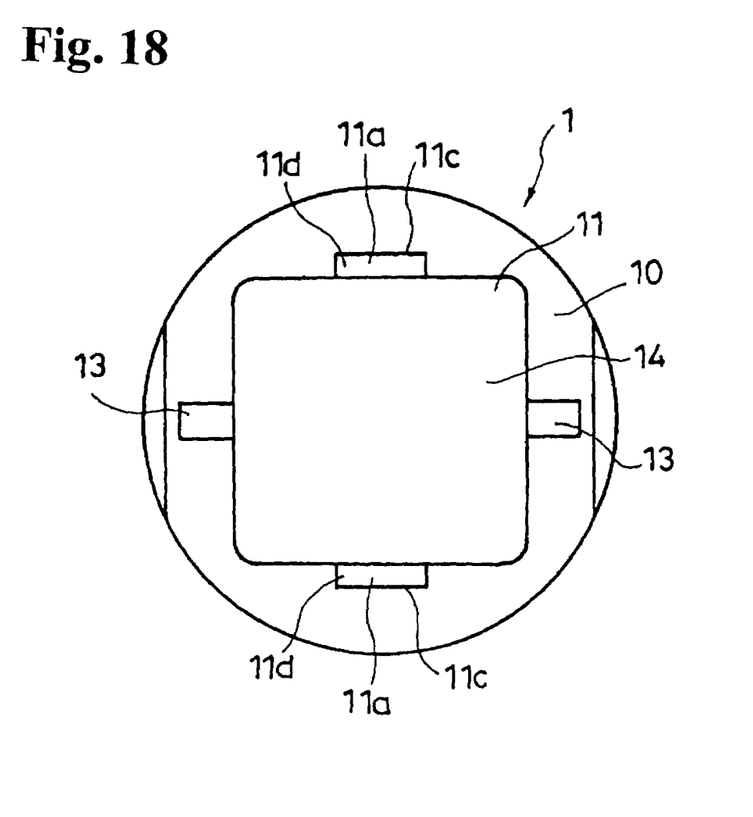
FIG. 18 is a bottom view of the female part.

FIGS. 2 and 3 show a state where the connector R is temporarily fixed to an attaching hole H. FIGS. 4 and 5 show a state where the connector R is permanently fixed to the attaching hole H. FIGS. 3 and 5 show a state where the connector R is viewed from an angle shifted by 90° from that in FIGS. 2 and 4. FIGS. 6 to 8 show the connector R; FIGS. 9 to 13 show a male part 2 constituting the connector R; and FIGS. 14 to 18 show a female part 1 constituting the connector R, respectively.

According to the invention, the connector R includes a female part 1 to be inserted into the attaching hole H formed in a panel P or the like and temporarily fixed thereto; and a male part 2 to be temporarily fixed to the female part 1. When the male part 2 is pushed into the female part 1 from the state that the female part 1 is temporarily fixed to the attaching hole H, the female part 1 is permanently fixed to the attaching hole H. The connector R connects or interlocks two or more members in the permanently fixed state.

The female part 1 includes a head portion 10, a leg portion 11, and an inner space 12 opened at a side of the head portion 10 and extending to a side of the leg portion 11. In other words, the female part 1 is formed in a cylindrical shape at least a part thereof.

In the embodiment shown in the drawings, the leg portion 11 of the female part 1 is formed in a square hollow shape. The head portion 10 of the female part 1 is formed in a disc shape. A square opening portion 10a is formed at substantially the center of the disc shape head portion 10. In the leg portion 11, the inner space 12 communicates with the opening portion 10a and extends to approximately the middle of the leg portion 11 in a longitudinal direction. The leg portion 11 includes four outer surfaces, and the inner space 12 is formed of four inner walls. The leg portion 11 has a substantially square outer cross section, and a substantially square inner cross section at a portion where the inner space 12 is formed.

In the embodiment as shown in the drawings, the female part 1 is inserted into the square attaching hole H formed in the panel P or the like from a forward end of the leg portion 11 in a direction that the outer surfaces of the leg portion 11 face the corresponding edges of the attaching hole H until the head portion 10 abuts against the attaching hole H. Especially, in the embodiment shown in the drawings, positioning ribs 13 are provided on a pair of the outer surfaces of the leg portion 11 positioned back to back with each other and extending to the forward end side of the leg portion 11 with upper ends thereof integrally jointed to the head portion 10. As a result, the leg portion 11 can be inserted into the attaching hole H only in a direction where the positioning ribs 13 are inserted into positioning depressed portions Ha.

The female part 1 also includes engaging projections 11a on the outer surfaces of the leg portion 11. In the embodiment as shown in the drawings, the engaging projections 11a are formed on a pair of the outer surfaces of the leg portion 11 positioned back to back with each other where the positioning ribs 13 are not formed and the inner space 12 is provided inside, i.e. portions extending from approximately the middle of the leg portion 11 in a longitudinal direction to the head portion 10.

The female part 1 is structured such that when the leg portion 11 is inserted into the attaching hole H, the engaging projections 11a are pressed against the attaching hole H, so that the portions where the engaging projections 11a are formed bend elastically toward the inner space 12. Further, the leg portion 11 is allowed to enter into a position where the engaging projections 11a are positioned ahead of the hole edge portion at an insertion side of the attaching hole H.

In the embodiment as shown in the drawings, the engaging projection 11a is provided on outer surface portion defined by a pair of vertical expanding slots 11e formed along the longitudinal direction of the leg portion 11 and a horizontal expanding slot 11f extending between the lower ends (slot ends opposite to the head 10 side) of the pair of the vertical expanding slots 11e and formed substantially at the middle of the leg portion 11 in the longitudinal direction. In other words, in the embodiment as shown in the drawings, an elastic member 11g is formed on the leg portion 11 and defined by the pair of the vertical expanding slots 11e and the horizontal expanding slot 11f. An upper end of the elastic member 11g is integrally connected to the head portion 10 side, and the engaging projection 11a is formed on an outer side of the elastic member 11g.

The engaging projection 11a includes an engaging surface 11b facing the head portion 10 side. A space between the engaging surface 11b and the head portion 10 is set to be a length substantially equal to a thickness of the member in which the attaching hole H is formed, i.e. the panel P in the embodiment as shown in the drawings. A length between the projection ends 11c of the engaging projections 11a formed on both sides of the leg portion 11 is set to be slightly longer than a length between the hole edges of the attaching hole H facing the outer surfaces of the leg portion 11 on which the engaging projections 11a are disposed.

Therefore, when the leg portion 11 of the female part 1 is inserted into the attaching hole H, the engaging projections 11a are pressed against the hole edge of the attaching hole H. The portions where the engaging projections 11a are formed bend elastically toward the inner space 12, so that the leg portion 11 is inserted into the attaching hole H. Under this state, when the leg portion 11 is further inserted until the engaging projections 11a are positioned at a portion ahead of the hole edge portion at the insertion side of the attaching hole H, the portions where the engaging projections 11a are formed are bounced. Accordingly, the member with the attaching hole H is sandwiched between the head portion 10 and the engaging projections 11a, so that the female part 1, i.e. the connector R, is temporarily fixed to the member.

Incidentally, in the embodiment as shown in the drawings, an inclined surface 11d gradually rising toward the projecting end 11c of the engaging projection 11a is formed on the engaging projection 11a at a side facing the forward end of the leg portion 11. As a result, when the leg portion 11 is inserted into the attaching hole H, the portion where the engaging projection 11a is formed, i.e. the elastic member 11g, bends smoothly due to the inclined surface 11d.

The male part 2 includes a pressing head portion 20 and an insertion leg portion 21 to be inserted into the inner space 12 of the female part 1. The insertion leg portion 21 has an outer shape similar to an inner contour of the inner space 12 of the female part 1. In the embodiment as shown in the drawings, the insertion leg portion 21 has a substantially square cross section and four outer surfaces. The insertion leg portion 21 has a rectangular hollow shape with both open ends, and a space 21a (described later) is formed at the interior of the insertion leg portion 21.

The pressing head portion 20 includes a disk shape main portion 20a and arm portions 20b extending sideward from both sides of the main portion 20a in a radial direction. An open portion 20f communicating with the interior of the insertion leg portion 21 is formed at substantially the center of the main portion 20a.

The first engaging portions 21b are provided on the insertion leg portion 21 of the male part 2 at a forward end side (i.e. side opposite to the pressing head portion 20) for engaging the inner walls of the female part 1. Also, the second engaging portions 21d are formed on the insertion leg portion 21 of the male part 2 at a base side for engaging the inner walls of the female part 1.

The first engaging portion 21b engages the inner wall of the female part 1 in a state that the insertion leg portion 21 of the male part 2 is slightly inserted into the inner space 12 of the female part 1, so that the male part 2 and the female part 1 are temporarily assembled. In other words, the first engaging portions 21b hold the male part 2 and the female part 1 together until the insertion leg portion 21 of the male part 2 is completely inserted into the inner space 12 of the female part 1 to thereby form the permanently fixed state (described later).

In the embodiment as shown in the drawings, the first engaging portions 21b are located on a pair of outer surfaces positioned back to back with each other among the four outer surfaces constituting the insertion leg portion 21 of the male part 2. The first engaging portions 21b are disposed at the forward end portion of the insertion leg portion 21. In the embodiment as shown in the drawings, the first engaging portions 21b are formed of a pair of rib-shape members 21c, 21c extending in the longitudinal direction of the insertion leg portion 21.

The rib-shape member 21c has a width so that the rib-shape member 21c can enter the vertically expanding slot 11e formed on the leg portion 11 of the female part 1. A space between the pair of the rib-shape members 21c is substantially equal to a space between the pair of the vertical expanding slots 11e.

In the embodiment as shown in the drawings, the insertion leg portion 21 of the male part 2 is inserted through the opening portion 10a of the female part 1 such that the outer surface portion of the insertion leg portion 21 provided with the first engaging portion 21b faces the inner wall of the leg portion 11 of the female part 1 positioned inside of the engaging projection 11a. Accordingly, the rib-shape member 21c enters the vertically expanding slot 11e mainly through the elastic deformation of the male part 2. Then, the upper end of the rib-shape member 21c hooks the upper end of the vertically expanding slot 11e through elastic restoration. As a result, the male part 2 and the female part 1 are temporarily assembled (FIGS. 2 and 3).

Specifically, in the embodiment as shown in the drawings, the pair of the outer surface portions of the male part 2 provided with the first engaging portions 21b has end portions positioned ahead of the pair of the outer surface portions not provided with the first engaging portions 21b. Thus, when the male part 2 is inserted into the female part 1, the projected portions are elastically deformed inwardly to thereby allow the rib-shape members 21c to enter the vertically expanding slots 11e.

In the embodiment as shown in the drawings, the rib-shape members of the male part 2 hook the vertically expanding slots 11e of the female part 1, and the forward ends thereof are positioned at the base side of the elastic member 11g. Thus, the temporarily assembled male part 2 does not prevent the elastic member 11g of the female part 1 from bending inwardly. Also, in the embodiment as shown in the drawings, the forward end portion of the insertion leg portion 21 with the rib-shape member of the male part 2 is provided with an inclined surface 21f inclined in the direction narrowing the insertion leg portion 21 toward the lower end of the rib-shape member 21c. Thus, the elastic member 11g of the female part 1 is not prevented from bending inwardly even in the temporarily assembled state.

In the embodiment as shown in the drawings, in the temporarily assembled state, the second engaging portion 21d abuts against the edge portion of the opening portion 10a of the female part 1 from above. Thus, the male part 2 does not move unexpectedly from a position in the temporarily assembled state to a position where the male part 2 is completely inserted into the female part 1.

The second engaging portions 21d elastically engage the inner walls of the female part 1 when the male part 2 is inserted into the female part 1 from the temporarily assembled state. When the male part 2 is inserted into the position where the second engaging portions 21d engage, the insertion leg portion 21 of the male part 2 prevents the engaging projections 11a of the female part 1 from bending inwardly.

In the embodiment as shown in the drawings, the second engaging portions 21d are formed of a pair of outer surface portions positioned back to back among the four outer surfaces constituting the insertion leg portion 21 of the male part 2, and formed on the outer surface portions not provided with the first engaging portions 21b at the base side of the insertion leg portion 21.

In the embodiment as shown in the drawings, the second engaging portions 21d are formed in protruding portions 21e arranged such that lower ends of the second engaging portions 21d are positioned above upper ends of the rib-shape members 21c constituting the first engaging portions 21b of the insertion leg portion 21, and upper ends of the second engaging portions 21d are positioned under the pressing head portion 20. The protruding portion 21e has a height from the outer surface portion gradually increasing from the lower end to the upper end. A space between the pair of the protruding portions 21e at the maximum projected height is set to be slightly larger than that between the inner wall portions of the female part 1 positioned inside of the outer wall portions where the engaging projections 11a are not formed.

In the embodiment as shown in the drawings, in the temporarily assembled state, the lower ends of the protruding portions 21e abut against the edge portion of the opening portion 10a of the female part 1 from above. It is arranged such that the second engaging portions 21d of the male part 2 engage with a force larger than that necessary for elastically deforming the engaging projects 11a of the female part 1.

In the embodiment as shown in the drawings, when the insertion leg portion 21 of the male part 2 is completely inserted into the leg portion 11 of the female part 1 from the temporarily assembled state, the second engaging portions 21d, i.e. the protruding portions 21e, engage the inner walls of the female part 1 in a pressed state by elastically deforming mainly the male part 2, so that the completely inserted state is maintained.

When the male part 2 is completely inserted into the female part 1 as described above, the male part 2 completely inserted into the female part 1 from the temporarily assembled state prevents the portions of the female part 1 where the engaging projections 11a are formed from bending inwardly. As a result, the female part 1 temporarily attached to the attaching hole H as described above is permanently attached to the attaching hole H. (refer to FIGS. 4 and 5)

In the embodiment shown in the drawings, the portions where the second engaging portions 21d are formed have rigidity higher than that of the elastic members 11g where the engaging projections 11a are formed. Therefore, the second engaging portions 21d of the male part 2 engage with a force larger than that required for elastically deforming the engaging projections 11a of the female part 1.

As a result, in the present embodiment, when the female part 1 is temporarily attached to the attaching hole H of the member provided with the attaching hole H through the insertion engaging projections 11a, the temporary attachment can be carried out while pushing the pressing head portion 20 of the male part 2. Then, after the female part 1 is ready to be permanently fixed to the attaching hole H, the pressing head portion 20 of the male part 2 is pressed to be in the permanently fixed state.

In the embodiment as shown in the drawings, when the male part 2 is inserted completely as described above, the second engaging portions 21d engage the inner walls of the female part 1 through the press contact of the second engaging portions 21d against the inner walls of the female part 1 mainly due to the elastic deformation of the male part 2. Therefore, even after completing the permanent fixed state, when the male part 2 is extracted from the female part 1 by holding the pressing head portion 20 of the male part 2, the permanently fixed state can be released. Thus, when it is necessary to release the permanent fixed state, the female part 1 does not need to be forcedly extracted from the attaching hole H. Accordingly, it is possible to eliminate breakage of the engaging projections 11a and damage on the attaching hole H side due to the forced extraction of the female part 1.

In the present embodiment, a pair of maintaining engagement portions 20c is provided on one of the pressing head portion 20 of the male part 2 and the head portion 10 of the female part 1. When the male part 2 is inserted into the engaging position where the second engaging portions 21d engage the inner walls of the female part 1 from the temporarily assembled state, the maintaining engagement portions 20c elastically engage the other of the pressing head portion 20 of the male part 2 and the head portion 10 of the female part 1 for maintaining the permanently fixed state. Accordingly, the permanently fixed state is not released unless the maintaining engagement portions 20c are released.

In the embodiment as shown in the drawings, the maintaining engagement portions 20c are provided at the pressing head portion 20 of the male part 2. Specifically, the projecting portions 20d are provided at the forward ends of the arm portions 20b extending laterally from the main portion 20a of the pressing head portion 20, and project from the forward ends toward the forward end of the insertion leg portion 21. Also, projecting portions 20e are provided at the forward ends of the projecting portions 20d, and project toward outer surface portions of the insertion leg portion 21 where the second engaging portions 21d are provided.

When the male part 2 is completely inserted into the female part 1 from the temporarily assembled state, the projecting portions 20e are pressed against the edge portions of the head portion 10 of the female part 1. Accordingly, the forward ends of the arm portions 20b are elastically deformed in a direction that the forward ends thereof slightly bend upwardly, so that the arm portions 20b move the projecting portion 20e outwardly. Then, the projecting portions 20e enter the back surface sides of the head 10 of the female part 1 due to the elastic deformation of the arm portions 20b. When the arm portions 20b elastically restore at the entered positions, the projecting portions 20e hook the back surfaces of the head portion 10 of the female part 1. In other words, in the embodiment as shown in the drawings, the projecting portions 20e function as the aforementioned maintaining engagement portions 20c.

In the present embodiment, a driver or the like is inserted between the arm portion 20b and the head portion 10 of the female part 1 to deform the arm portion 20b elastically, so that it is possible to release the projecting portions 20e from the head portion 10 of the female part 1.

Also, in the present embodiment, as described above, the second engaging portions 21d of the male part 2 are formed of the extruding portions 21e formed on the outer surfaces of the insertion leg portion 21. Further, the space 21a is formed at the insertion leg portion 21 for elastically bending the portions where the extruding portions 21e are formed. With this configuration, in the present embodiment, it is possible to insert the male part 2 smoothly into the female part 1 from the temporarily assembled state while elastically deforming mainly the male part 2.

In the embodiment as shown in the drawings, two expanding slots 21g are formed on the outer surfaces where the first engaging portions 21b are formed among the four outer surfaces of the inserting leg portion 11 of the male part 2 between the pressing head portion 20 and the upper ends of the rib-shape members 21c functioning as the first engaging portions 21b. Accordingly, it is easy to elastically deform inwardly the portions where the second engaging portions 21d are formed when the male part 2 is completely inserted into the female part 1.

The female part 1 and the male part 2 constituting the connector R are formed in plastic molding articles using a synthetic resin, so that it is possible to make the necessary portions of the connector R having the structure as described above flexible.

Incidentally, in the embodiment as shown in the drawings, the outer surfaces of the leg portion 11 of the female part 1 at the forward end side, specifically, the forward portion from the portion where the inner space 12 is formed, are coated with a soft synthetic resin. The forward end side with a coating 14 is inserted into a long hole 201 of a member to be attached to a member provided with the attaching hole H, so that the member provided with the attaching hole H is attached to the member provided with the long hole 201.

The connector R as described above is used for connecting or fixing, for example, two panels P having the attaching holes H to communicate with each other. Also, the connector R can be used for connecting the member with the attaching hole H and the member with the long hole 201 communicating with the attaching hole H, so that the former can regularly move along the long hole 201 of the latter.

Also, the connector R as described above is applicable to an attaching structure of a box member 100 as shown in FIG. 1. In the attaching structure, a box member 100 has an open upper portion, and is rotatably attached to fixed side panels 200 at side portions 101. The attaching holes H are provided in the side portion 101, and the leg portion 11 of the female part 1 of the connector R is inserted into the attaching hole from an inside of the box. The fixed side panel 200 is provided with a long hole 201 along a rotational path of the box member 100, and the leg portion 11 of the female part 1 is inserted into the long hole through the attaching hole H.

In the embodiment as shown in FIG. 1, shafts (not shown) are inserted into shaft holes 202 provided in the fixed side panels 200 and shaft holes 102 provided in the side portions 101 of the box member 100, so that the box member 100 is rotatably attached to the fixed side panels 200.

In the attaching structure as described above, the connectors R are inserted into the attaching holes H on the box member 100 side from the inside of the box member 100 so as to be temporarily assembled. After it is confirmed that the forward end side of the female part 1 of the connector R is properly inserted into the long hole 201 on the fixed side panel 200, the connector R is permanently fixed thereto. Thus, the box member 100 is rotatably attached to the fixed side panel 200. Further, the connector R abuts against the front end of the long hole 201, so that the connector R functions as a stopper for the box member 100.

When the box member 100 is removed, the maintaining engagement portion 20c is disengaged and the male part 2 is pulled out from the female part 1 from the inner side of the box member 100, so that the permanently fixed state is easily released.

According to the connector of the invention, the pressing head portion of the male part is pressed to insert the female part into the attaching hole during the temporary fixing operation of the female part. As far as the pressing head portion of the male part is pressed with a force that allows the engaging portion of the female part to elastically deform so as to engage the attaching hole, the male part is not completely inserted into the female part during the temporary fixing. Thus, it is possible to eliminate a chance that the connector is inadvertently fixed to the attaching hole permanently.

While the invention has been explained with reference to the specific embodiments of the invention, the explanation is illustrative and the invention is limited only by the appended claims.

What is claimed is:

1. A connector for fastening a member with an attaching hole, comprising: a female part having a head portion, a leg portion connected to the head portion, an inner space formed in the leg portion and opened at the head portion, and an engaging projection formed as a tab on an outer surface of the leg portion by a surrounding cutout portion, said engaging projection having a first strength to elastically bend inwardly to engage the attaching hole when the leg portion is inserted into the attaching hole, and a male part having a pressing head portion, an inserting leg connected to the pressing head portion to be inserted into the inner space of the female part, a first engaging portion formed on an outer surface of the inserting leg at a forward end thereof for engaging an inner wall of the female part so that the male part is temporarily fixed to the female part at a temporary engaging state, a second engaging portion including a projection on the outer surface of the inserting leg at a base end thereof to project outwardly therefrom, and an empty space for allowing the projection of the second engaging portion to bend elastically inwardly, said second engaging portion, when the male part is completely inserted into the female part from the temporary engaging state to a complete engaging state, being inwardly bent and elastically engaged with the inner wall of the female part to permanently fix the connector to the attaching hole, said second engaging portion having a second strength greater than the first strength so that when male part in the temporary engaging state with the female part is pushed to engage said member, the engaging projection with the first strength is deformed first to engage said member and then the second engaging portion bends and enters the inner space, wherein said inserting leg flushly abuts the engaging projection of the female part to prevent the engaging projection from bending inwardly in the complete engaging state, and said first engaging portion is located in the cutout portion in both the temporary and complete engaging states.

2. A connector as claimed in claim 1, wherein said inserting leg has a length so that in the temporary engaging state, the inserting leg is located above the engaging projection to allow the engaging projection to bend inwardly.

3. A connector according to claim 1, further comprising a maintaining engagement portion formed on either the pressing head portion of the male part or the head portion of the female part for engaging the other of the pressing head portion or the head portion so that the male part is permanently fixed to the female part.

4. A connector as claimed in claim 1, wherein said second engaging portion projecting outwardly from the inserting leg engages an edge of the female part in the temporary engaging state.

5. A connector as claimed in claim 1, wherein said female part further includes a rib on the leg portion to project outwardly therefrom, said second engaging portion being located radially adjacent to the rib in the complete engaging state with the leg portion interposed therebetween.

6. A connector as claimed in claim 5, wherein said male part further includes a pair of grooves to sandwich the second engaging portion therebetween to allow the second engaging portion to easily bend inwardly.

* * * * *